United States Patent [19]
Shirai et al.

[11] Patent Number: 6,153,558
[45] Date of Patent: Nov. 28, 2000

[54] THERMAL TRANSFER IMAGE-RECEIVING SHEET FOR STICKER AND METHOD OF MANUFACTURING SAME

[75] Inventors: Koichi Shirai; Atsushi Tatehana; Katsuyuki Oshima, all of Tokyo-to, Japan

[73] Assignee: Dai Nippon Printing Co., Ltd., Tokyo-to, Japan

[21] Appl. No.: 09/144,923

[22] Filed: Sep. 1, 1998

[30] Foreign Application Priority Data

Sep. 8, 1997 [JP] Japan ................................. 9-242663

[51] Int. Cl.$^7$ .............................. B41M 5/035; B41M 5/38
[52] U.S. Cl. ......................... 503/227; 427/152; 428/41.8; 428/910; 428/913; 428/914
[58] Field of Search .................... 8/471; 428/195, 428/41.8, 913, 914, 910; 503/227; 427/152

[56] References Cited

U.S. PATENT DOCUMENTS 5,683,954  11/1997  Sogabe et al. ......................... 503/227

*Primary Examiner*—Bruce H. Hess
*Attorney, Agent, or Firm*—Ladas & Parry

[57] ABSTRACT

A thermal transfer image-receiving sheet for a sticker comprises a sticker portion and a release sheet portion, the sticker portion being comprising a substrate, a receptor layer disposed on a front surface side of the substrate and an adhesive layer disposed on a back surface side of the substrate, the release sheet portion being comprising a support sheet and a grip layer disposed on a back surface side of the support sheet, and an adhesive area of a back surface of the sticker portion being covered with the release sheet in a peelable adhesion with a front surface of the release sheet portion facing to the back surface of the sticker portion, wherein said grip layer is a non-oriented synthetic resin layer having a softening point of 110° C. or more. The grip layer is well bitten by spikes of a grip roller of a printer to prevent misregistering. The grip layer is preferably formed by extrusion lamination.

17 Claims, 1 Drawing Sheet

THERMAL TRANSFER IMAGE-RECEIVING SHEET FOR STICKER AND METHOD OF MANUFACTURING SAME

BACKGROUND OF THE INVENTION

1. Field of the Invention

The present invention relates to a thermal transfer image-receiving sheet for a sticker and a method of manufacturing the same and in particular to a thermal transfer image-receiving sheet for a sticker which can prevent misregistering easily occurring in the thermal transfer image-receiving sheet in forming color printed images thereon and a method of manufacturing the same.

2. Description of the Related Art

In a general method for forming color printed images on a thermal transfer image-receiving sheet, a thermal transfer sheet having a color material layer consisting of 3 or 4 colors of yellow, magenta and cyan, and as necessary black alternately provided side by side thereon, and a thermal image-receiving sheet provided with a receptor layer as necessary, are first passed between a heating device and a platen roller pressed at certain pressure. Simultaneously, a heating portion of the heating device is selectively heated depending on information of an image to be printed, so a color material contained in the color material layer in the thermal transfer sheet is transferred to the thermal transfer image-receiving sheet or the receptor layer thereof to form a printed image. The thermal transfer sheet is provided with 3 or 4 colors subsequently, and thermal transfer process is repeated at several times to the same position in the thermal transfer image-receiving sheet whereby different colors are transferred and overlaid successively to form a color printed image thereon. In particular, thermal transfer of sublimation type is superior to thermal transfer of heat melting type in high resolution and multi-tone expression, and is used where high-quality printed images are required.

As one of such color printed image-forming systems, there is a system in which a color material layer on a thermal transfer sheet is overlaid over the whole surface for one picture on a thermal transfer image-receiving sheet, and the printed image of one picture is formed all at once. In this system, after a certain color is printed, the image-receiving sheet is reciprocated, while the thermal transfer sheet is wound in the moving direction to effect repeated printing on the same picture. By overlaying each color in this manner, a full color printed image is formed. The advantage of this system is that if positional accuracy is given, printed images are beautifully finished with a high printing speed due to the absence of overlaps between lines which appear in the serial system. However, this system has the disadvantages such as easy occurrence of so-called misregistering due to poor positional accuracy on a paper, difficulty in attaining the miniaturization, lightening and low price of printers therefor, and so on.

As printers used in the above-described systems, the following printers are known.

For example, a printer for reciprocating a thermal transfer image-receiving sheet by fastening one end of the sheet with a chucking member is excellent in convey accuracy because the sheet is reciprocated with the independent chuck member. However, a relatively large thermal transfer image-receiving sheet of e.g. A3 or more in size, which can though be easily printed, requires a large, mechanically complicated and expensive printer, with which a small thermal transfer image-receiving sheet is difficult to print.

A printer for reciprocating a thermal transfer image-receiving sheet by rotation of a platen roller provided thereon with a chucking member fixing one end of the sheet, suffers from the problem of failing to send the thermal transfer image-receiving sheet in order to discharge it.

A printer for reciprocating a thermal transfer image-receiving sheet by rotation of grip rollers consisting of a rubber roller and a metal roller for fixing one end of the sheet therebetween is used most widely at present because its simple structure enables miniaturization thus making the price of the printer low. The grip rollers in this printer consist of a rubber roller for preventing a paper from sliding and a metal roller having fine and thin spikes of about 40 to 100 $\mu$m in height formed thereon by etching for conveying the paper accurately by biting it by the spikes. Originally, the grip rollers were used mainly in single-color printers such as those for blueprint diazo copy or drafting not requiring the reciprocating motion of a thermal transfer image-receiving sheet, and therefore, printers using the grip rollers are poor in convey accuracy and easily cause misregistering where the thermal transfer image-receiving sheet is reciprocated for printing. If the press between the rubber roller and the metal roller is increased, convey accuracy at the time of reciprocating motion is improved, but the spikes on the metal roller bite into the thermal transfer image-receiving sheet to leave spike marks on the sheet. These spike marks are a great problem particularly in the case where the thermal transfer sheet is thin, and some spike marks penetrate the thermal image-receiving sheet to reach the surface of the image-receiving face thereof, resulting in deterioration of the qualities of the printed product.

To solve the problem, there have been marketed thermal transfer image-receiving sheets adapted to various types of printers, in consideration of characteristics of commercial printers, such as convey accuracy of the printers, press between grip rollers, degree of spike marks occurring with increasing press between grip rollers, or the like. By way of example, such thermal transfer image-receiving sheets are thickened to prevent the influence of spikes on the image-receiving face even if the press between the grip rollers is increased to improve convey accuracy.

However, it significantly increases costs for development and manufacture to provide thermal transfer image-receiving sheet with specifications adapted to various types of printers. Further, thickening of thermal transfer sheets to reduce the effect of spikes can result not only in a limit to thickness and layer structure preferable for usual thermal transfer image-receiving sheets but also in a limit to usual functions of sheets, for example, characteristics such as texture, drape, luster etc.

SUMMARY OF THE INVENTION

The first object of the present invention is to provide a thermal transfer image-receiving sheet for a sticker with improvements in convey accuracy even using various types of printers, thus permitting color printed images to be formed without misregistering.

The second object of the present invention is to provide a thermal transfer image-receiving sheet for a sticker, which does not permit spike marks on a back surface side thereof to reach the image-receiving face thereof, thus reducing the influence of spike marks on the qualities of printed images.

The third object of the present invention is to provide a manufacturing method, which can easily form a thermal transfer image-receiving sheet for a sticker achieving color printed images excellent in qualities without misregistering and spike marks.

The thermal transfer image-receiving sheet for a sticker according to the present invention comprises a sticker portion and a release sheet portion, the sticker portion comprising a substrate, a receptor layer disposed on a front surface side of the substrate and an adhesive layer disposed on a back surface side of the substrate, the release sheet portion comprising a support sheet and a grip layer disposed on a back surface side of the support sheet, and an adhesive area of a back surface of the sticker portion being covered with the release sheet in a peelable adhesion with a front surface of the release sheet portion facing to the back surface of the sticker portion, wherein said grip layer is a non-oriented synthetic resin layer having a softening point of 110° C. or more whereby the first object described above was achieved. According to this invention, spikes on the metal roller bite well into the non-oriented synthetic resin layer having a softening point of 110° C. or more as the grip layer, so neither sliding nor misregistering occurs between the metal roller and the thermal transfer image-receiving sheet for a sticker at the time of reciprocating motion for forming a color printed image. Accordingly, the convey accuracy of the thermal transfer image-receiving sheet for a sticker is improved and color printed images can be formed without misregistering. Here, said grip layer is preferably a non-oriented polyolefin resin layer or a non-oriented polyester resin layer, particularly the non-oriented polyolefin resin layer, and most preferably a non-oriented polypropylene resin layer.

Said release sheet portion is preferably composed of a support sheet, a polyethylene resin layer disposed on a front surface side of said support sheet, and a grip layer disposed on a back surface side of said support sheet. Since the polyethylene resin layer can be easily surface-treated for improvement of peelability, this layer is suitable for improvement of peelability between the release sheet portion and the sticker portion.

Further, said release sheet portion is composed of a support sheet, a first polyethylene resin layer disposed on a front surface side of said support layer, a second polyethylene resin layer disposed on a back surface side of said support layer, and a grip layer disposed on a back surface side of said second polyethylene resin layer, whereby the first and second objects as described above were achieved. According to the present invention, the second polyethylene resin layer has an advantage in that it raises the adhesion between the support sheet disposed on the front surface side thereof and the grip layer disposed on the back surface side thereof. The second polyethylene resin layer can prevent spike marks due to the metal roller from reaching the image-receiving face. Here, the grip layer is preferably formed of a non-oriented polypropylene resin layer. By this, spike biting is improved, convey accuracy is improved, and color printed images can be formed without misregistering. Further, the second polyethylene resin layer is preferably formed of resin based on high-density polyethylene resin. The high-density polyethylene resin is not so hard as polypropylene resin but is the hardest among polyethylene resins, so if high-density polyethylene is used as the ground of the non-oriented polypropylene resin, the adhesion between the non-oriented polypropylene resin layer and the support sheet is improved, and spikes are prevented from reaching the image-receiving face while spike biting becomes very easy. Accordingly, it can work cooperatively with the non-oriented polypropylene resin layer as the outermost grip layer to improve the convey accuracy of the thermal transfer image-receiving sheet, thus preventing misregistering.

Said grip layer of the thermal transfer image-receiving sheet for a sticker is formed preferably by extrusion lamination, and if the second polyethylene resin layer is interposed between the support sheet and the grip layer, the secondary polyethylene resin layer and the grip layer are formed preferably by co-extrusion lamination.

Further, said support sheet is preferably a cellulose paper, and the thickness of said grip layer is preferably in the range of 20 to 50 $\mu$m. By this, spike biting is further improved and misregistering can be prevented.

Then, the method of manufacturing a thermal transfer image-receiving sheet for a sticker according to the present invention comprises the steps of: providing a sticker portion comprising a substrate, a receptor layer disposed on a front surface side of the substrate and an adhesive layer disposed on a back surface side of the substrate, forming a release sheet portion comprising a support sheet and a grip layer made of a non-oriented synthetic resin layer disposed on a back surface side of the support sheet by applying a synthetic resin having a softening point of 110° C. or more on the support sheet through extrusion lamination, and covering an adhesive area of a back surface of the sticker portion with the release sheet portion in a peelable adhesion by laminating the release sheet portion so as to face a front surface of the release sheet portion to the back surface of the sticker portion, whereby the third object as described above was achieved. According to this invention, the synthetic resin having a softening point of 110° C. or more is subjected to extrusion lamination whereby a layer of the synthetic resin in the non-oriented state can be easily formed. The non-oriented layer of this synthetic resin is easily bitten by spikes, so the thermal transfer image-receiving sheet for a sticker which can achieve color printed images without misregistering can be easily formed.

Further, in the step of conducting extrusion lamination, the synthetic resin having a softening point of 110° C. or more is applied on the support sheet together with polyethylene resin through co-extrusion lamination to form the release sheet portion further comprising a polyethylene resin layer disposed on the back surface side of the support sheet so as to be interposed between the support sheet and the grip layer. The polyethylene resin layer which can improve the adhesion between the support sheet and the grip layer and can further prevent spikes from reaching the image-receiving face as well as the grip layer bitten well by spikes is easily formed by co-extrusion lamination, so the thermal transfer image-receiving sheet for a sticker which can achieve color printed images without misregistering and color printed images excellent in qualities free of spike marks can be easily formed.

Further, in this manufacturing method, the synthetic resin with a softening point of 100° C. or more is preferably polyolefin resin or polyester resin, particularly the polyolefin resin, most preferably polypropylene resin.

DETAILED DESCRIPTION OF THE PREFERRED EMBODIMENTS

Figure 1:
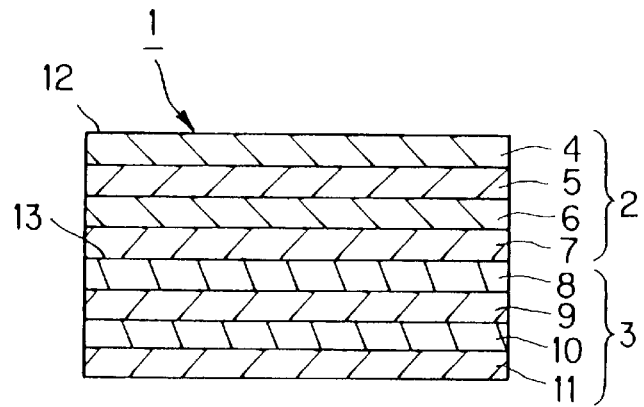
FIG. 1 is a schematically sectional view of one thermal transfer image-receiving sheet for a sticker according to the present invention; and, FIG. 2 is a schematic view showing the print mechanism of a printer which can preferably employ the thermal transfer image-receiving sheet of the present invention.

FIG. 1 is a sectional view showing one example of the thermal transfer image-receiving sheet for a sticker (referred to hereinafter as "thermal transfer image-receiving sheet 1"). The thermal transfer image-receiving sheet 1, when roughly divided, is composed of a sticker portion 2 and a release sheet portion 3.

The sticker portion 2 is composed of substrate 6, an intermediate layer 5 disposed on a front surface side of substrate 6, a receptor layer 4 disposed on a front surface side of the intermediate layer 5, and an adhesive layer 7 disposed on a back surface side of substrate 6. The intermediate layer 5 is not necessarily required and this layer is disposed as necessary depending on the prescribed properties of the thermal transfer image-receiving sheet 1.

The release sheet portion 3 is composed of support sheet 9, a first polyethylene resin layer 8 disposed on a front surface side of the support sheet 9, a second polyethylene resin layer 10 disposed on a back surface side of the support sheet 9, and a non-oriented polypropylene resin layer 11 serving as a grip layer disposed on a back surface side of the second polyethylene resin layer.

The adhesive area 13 of the sticker portion 2 is covered with the release sheet portion 3, such that the back surface of the sticker portion 2 faces to the front face of the release sheet portion 3, and the first polyethylene resin layer 8 of the release sheet portion 3 adheres to the adhesive area 13 on the back surface side of the sticker portion 2 in a peelable adhesion.

Figure 2:
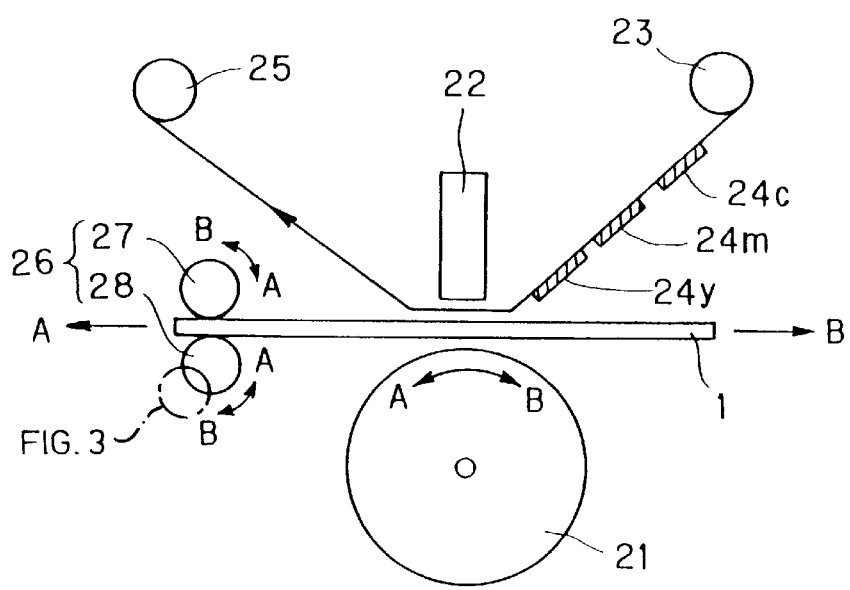
Figure 3:
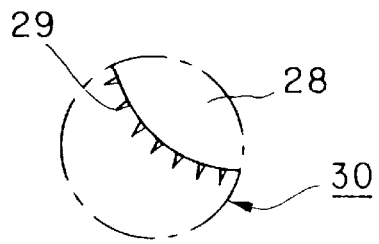
FIG. 3 is an enlarged view of the circled portion in FIG. 2.

FIG. 2 is a schematic view showing the print mechanism of a printer which can preferably employ the thermal transfer image-receiving sheet of the present invention. This printer is a type of conveying the thermal transfer image-receiving sheet 1 by grip rollers 26. The grip rollers 26 are composed of a rubber roller 27 for preventing a paper from sliding and a metal roller 28 having fine and thin spikes 29 of about 40 to 100 μm in height formed thereon by etching for conveying the paper accurately by biting it by the spikes.

In formation of images on the thermal transfer image-receiving sheet 1, the thermal transfer sheet 23 having a color material layer consisting of the 3 colors of yellow 24y, magenta 24m and cyan 24c alternately provided side by side and the thermal transfer image-receiving sheet 1 are interposed between the heating device 22 and the platen roller 21 and pressed at certain constant pressure therebetween. Then, the platen roller 21 and the grip roller 26 are rotated in the direction A, whereby the thermal transfer sheet 23 and the thermal transfer image-receiving sheet 1 advance in the direction A. Simultaneously, the heating device 22 is heated depending on image information, and the color material layer of the first color e.g. yellow in the color material layer 24y disposed on the thermal transfer sheet 23 is transferred to the receptor layer 4 disposed on the thermal transfer image-receiving sheet 1 to form a printed image of the first color.

The thermal transfer image-receiving sheet 1, which is sandwiched between the grip rollers 26 consisting of the rubber roller 27 pressed against the side of the sticker portion 2 and the metal roller 28 pressed against the side of the release sheet 3, advances in the direction A through the grip rollers rotating in accordance with the rotation of the platen roller 21. Further, the thermal transfer sheet 23 is wound on the wind-up roll 25.

Then, the press between the heating device 22 and the platen roller 21 is relieved, and the thermal transfer sheet 23 is once separated from the thermal transfer image-receiving sheet 1, and along with the platen roller 21, the grip rollers 26 are rotated in the direction B thus returning the thermal transfer image-receiving sheet 1 to the position where a printed image of a second color is to be formed. The color material layer of the second color in the thermal transfer sheet 23 is positioned for printing. Then, the thermal transfer sheet 23 and the thermal transfer image-receiving sheet 1 are pressed by the heating device 22 and the platen roller 21 and transferred in the direction A by rotation of the platen roller 21 and the grip rollers 26. Simultaneously, the color material of the second color, for example magenta 24m, is transferred in the same manner as described above to the receptor layer 4 on the thermal transfer image-receiving sheet 1, thus forming a printed image of the second color.

By conducting this operation repeatedly, a multi-color printed image is formed on the receptor layer 4 on the thermal transfer image-receiving sheet 1.

Hereinafter, the respective layers constituting the thermal transfer image-receiving sheet of the present invention, a method of forming thereof, and a method of manufacturing the thermal transfer image-receiving sheet are described.

First, the respective layers constituting the release sheet portion 3 and the method of forming the same are described.

Support Sheet

As the support sheet 9, the same support as in a conventional thermal transfer image-receiving sheet for a sticker can be used as such. The support sheet which can be preferably used is a single film, for example, polyolefin film such as polyethylene film or polypropylene film, or polyester film such as polyethylene terephthalate (referred to hereinafter as "PET"), or a composite film having these 2 or more layers laminated with or without an bonding layer. In addition, resin films such as hard vinyl chloride, acryl, vinylidene chloride etc. or papers, synthetic papers or cellulose papers etc. can be used. Out of these, cellulose papers are preferably used because these are well bitten by spikes. Examples of such cellulose papers include high-grade paper, coat paper, art paper, cast coat paper or processed paper in which constitutional resin or rubber is impregnated, coated or added.

The thickness of the support sheet 9 is usually about 35 to 100 μm in consideration of e.g. the strength thereof and the influence thereof on the total thickness of the thermal transfer image-receiving sheet 1.

First Polyethylene Resin Layer

The thermal transfer image-receiving sheet 1 of the present invention preferably has a polyethylene resin layer (referred to hereinafter as "first polyethylene resin layer 8") disposed on a front surface side of the support sheet 9. Since this first polyethylene resin layer 8 can be easily subjected to treatment for improvement of peelability, the peelability thereof from the adhesive layer 7 can be improved. For example, since a peeling agent such as silicone or the like can be easily applied to the face thereof in contact with the adhesive layer 7 to improve the peelability of the release sheet portion 3. The thickness of the first polyethylene resin layer 8 is preferably 6 to 30 μm, and this layer can be formed in any method known in the art.

The material of the peeling layer formed on the first polyethylene layer 8 may be a silicone-based peeling agent based on polymethylsiloxane etc. or polyolefin etc. The peeling layer can be formed according to a method known in the art by coating and drying a coating solution for the peeling layer. The amount of the peeling layer coated is usually in the range of 0.1 to 1 g/m² in terms of the weight of the dried coating.

Grip Layer

The non-oriented polypropylene resin layer 11 is disposed as the grip layer on the back of the thermal transfer image-receiving sheet 1. By disposing the grip layer, sliding between the thermal transfer image-receiving sheet 1 and the metal roller 28 can be prevented. Accordingly, at the time of reciprocating motion for forming multi-color printed images, the convey accuracy of the thermal transfer image-receiving sheet 1 is improved and multi-color printed images can be formed without misregistering.

The grip layer is a non-oriented synthetic resin layer with a softening point of 110° C. or more. This non-oriented synthetic resin layer is well bitten by spikes 29 on the metal roller 28, so there does not occur sliding between the metal roller 28 and the thermal transfer image-receiving sheet 1.

The oriented synthetic resin layer has high Young's modulus and is too hard to bitten with spikes 29. Therefore, if the grip layer is made of the oriented synthetic resin layer, sliding occurs between the metal roller 28 and the thermal transfer image-receiving sheet 1 at the time of reciprocating motion for forming color printed images, resulting in convey accuracy lowering and misregistering. The non-oriented synthetic resin with a softening point of less than 110° C. has wax-like properties, is brittle and poor in strength, and is easily removed depending on biting of spikes 29 at the time of reciprocating motion. On the other hand, the grip layer composed of the non-oriented synthetic resin layer with a softening point of 110° C. or more has suitable Young's modulus and suitable hardness, thus facilitating biting of spikes 29. This grip layer having suitable Young's modulus and suitable hardness holds bitten spikes 29 well to prevent trembling of spikes 29 and does not cause swerve between the thermal transfer image-receiving sheet 1 and the metal roller 28 at the time of rotation of the metal roller 28. Further, because it is not so brittle as wax, the grip layer will not be destroyed by biting of spikes 29.

The non-oriented synthetic resin layer with a softening point of 110° C. or more is preferably a non-oriented polyolefin resin layer or a non-oriented polyester resin layer, particularly preferably the non-oriented polyolefin resin layer. Out of these, the non-oriented polypropylene resin layer 11 is particularly excellent in biting of spikes 29. The material of polyolefin resin is inexpensive and advantageous in respect of costs.

The method of forming the grip layer on the support sheet 9 may be a method where the non-oriented synthetic resin is previously formed into a film, and the non-oriented synthetic resin film is laminated on the support sheet 9 to form the grip layer, a method where a prepared coating solution is coated to form the grip layer, or a method of extrusion lamination. Among these methods, the method of extrusion lamination is most preferable because the synthetic resin layer in the non-oriented state can be easily formed, its process has already been established and this method is superior in costs. The coating method is requires a long time for drying after coating thus reducing line speed so its productivity is slightly lower than the extrusion lamination method, but this method can be used preferably in practice. The method of laminating the film can be used preferably in practice although the synthetic resin film in the non-orientated state is oriented slightly during lamination to become hard so that biting of spikes is worsened to cause slight misregistering.

The thickness of the grip layer is preferably in the range of 20 to 50 μm. In the case of the thickness of less than 20 μm, the biting of spikes 29 into the grip layer becomes deficient, and sliding occurs between the metal roller 28 and the thermal transfer image-receiving sheet 1 at the time of reciprocating motion for forming color printed images, which may cause misregistering. In the case of the thickness exceeding 50 μm, productivity for forming the grip layer is lowered to raise costs. In the case where the thermal transfer image-receiving sheet 1 is used as sticker, it is required to be thin in some cases, and the grip layer of more than 50 μm increases the total thickness of the thermal transfer image-receiving sheet, and said requirement cannot be met in some cases. Accordingly, the thickness of the grip layer is preferably limited to the range of 20 to 50 μm.

Second Polyethylene Resin Layer

A polyethylene resin layer (referred to hereinafter as "second polyethylene resin layer 10") may be formed as a primer coat between the grip layer and support sheet 9. The second polyethylene resin layer 10 can raise the adhesion between the support sheet 9 and the grip layer. Further, it is possible to prevent spike 29 from penetrating each layer from the back of the thermal transfer image-receiving sheet 1 to reach the image-receiving face 12.

Any of high-density polyethylene resin, medium-density polyethylene resin and low-density polyethylene resin can be preferably used in practice as the polyethylene resin constituting the second polyethylene resin layer 10. It is particularly preferable that the non-oriented polypropylene resin layer 11 is used as the grip layer, and that the second polyethylene resin layer 10 is formed of resin based on high-density polyethylene resin. By this, the best biting of spikes 29 is achieved, convey accuracy is improved, and color printed images can be formed without misregistering.

If the second polyethylene resin layer 10 is formed of resin based on high-density polyethylene resin which is not so hard as polypropylene resin but is the hardest among polyethylene resins, the adhesion between the grip layer and the support sheet 9 is improved and further the non-oriented polypropylene resin layer 11 as the grip layer and the second polyethylene resin layer 10 as the primer coat formed of resin based on high-density polyethylene resin work cooperatively to significantly improve the biting of spikes 29. At the same time, spikes 29 are prevented best from penetrating the thermal transfer image-receiving sheet 1 to reach the image-receiving face 12.

The method of forming the second polyethylene resin layer 10 on the back surface side of the support sheet 9 may be a method where a prepared coating solution is coated and dried to form it, a method where a polyethylene film is previously formed and the film is laminated on the support sheet 9 to form it, or a method of forming it by extrusion lamination. Alternatively, the second polyethylene resin layer 10, together with the grip layer made of synthetic resin with a softening point of 110° C. or more, can also be formed by co-extrusion lamination on the support sheet 9. Among these methods, the method of forming the second polyethylene resin layer 10 and the grip layer by co-extrusion lamination is most preferable because the second polyethylene resin layer 10 and the grip layer can be simultaneously formed, and simultaneously the grip layer can be formed as the synthetic resin layer in the non-oriented state, and further because its process has already established so this method is superior in costs. The coating method requires repeated coating and drying, thus reducing line speed so the productivity is slightly lower than the co-extrusion lamination method, but this method can be used preferably in practice.

To improve the adhesion between the second polyethylene resin layer 10 and the non-oriented polypropylene resin layer 11, modified polyethylene (Toughmer-A-4085, manufactured by Mitsui Petrochemical Industries, Ltd.) can also be blended with the second polyethylene resin to form the second polyethylene resin layer 10.

The thickness of the second polyethylene layer is preferably 10 to 18 μm.

Now, the respective layers forming the sticker portion 2 and the method of formation thereof are described.

Substrate

As substrate 6, the same substrate film in the conventional thermal transfer image-receiving sheet may be used as such. Substrate 6 is preferably a single film, for example, polyolefin film such as polyethylene film or polypropylene film or the like, or polyester film such as PET film or the like, or a composite film having these 2 or more layers laminated with or without an bonding layer. Further, it is also possible to use resin films composed of hard vinyl chloride, acrylic compounds, vinylidene chloride etc.

To use the above-described laminated composite film as substrate 6, an bonding layer is disposed in a method known in the art and its constitutional material includes polyacrylates, acrylic copolymers etc. and if necessary a reinforcing agent, a plasticizer, fillers etc. can be added.

By using substrate 6 as a composite film prepared by combining a foamed type film and a non-foamed type film, cushioning property can be improved to form further excellent printed images. For example, a composite film comprising a non-foamed PET film as a film in contact with adhesive layer 7 and a foamed polypropylene film as a film in contact with the intermediate layer 5 can be used.

The substrate 6 may be transparent or may be shaded by admixing it with a white pigment such as titanium, calcium carbonate or zinc oxide. Further, shading sheets such as synthetic papers, natural papers or the like can also be used.

Although the thickness of the substrate 6 is not particularly limited, its thickness is suitably selected usually in the range of about 30 to 100 μm in consideration of the intended use, strength etc. thereof.

Intermediate Layer

Although intermediate layer 5 is not necessarily required, this layer is disposed on a front surface side of the substrate 6 to confer various characteristics on the thermal transfer image-receiving sheet 1. For example, characteristics such as adhesion between layers, degree of whiteness, cushioning property, antistatic property, and screen property for shielding images etc. on the side of the opposite face can be imparted by the intermediate layer 5. As the intermediate layer 5, a suitable intermediate layer can be selected from those known in the art.

The intermediate layer 5 is provided by forming an intermediate layer material capable of imparting necessary characteristics in a known method such as coating, lamination or the like on the substrate 6 depending on the properties of said material.

Receptor Layer

In cases where the intermediate layer 5 is disposed on a front surface side of substrate 6 or on substrate 6, the receptor layer 4 is formed on a front surface side of the intermediate layer 5 and consists of at least binder resin, and various additives such as release agent etc. are added thereto as necessary. As the binder resin constituting the receptor layer 4, materials conventionally used for forming receptor layers, for example, saturated polyester resin, polyacrylate resin, vinyl chloridelvinyl acetate copolymer resin, polystyrene resin, polyamide resin or the like can be used solely or in combination.

The receptor layer 4 can be formed by coating and drying in a usual manner, for example by gravure coating, gravure reverse coating or roll coating. The amount of the receptor layer 4 coated is usually 2 to 6 $g/m^2$ in terms of the weight of the dried coating.

To prevent the thermal fusion between the receptor layer 4 and the thermal transfer sheet 23, a release agent is applied thinly onto the receptor layer 4 to form a release layer as necessary or may be incorporated into the receptor layer 4. As the release agent, silicone oil (e.g. epoxy-modified silicone and amino-modified silicone which are used in combination), fluorine- or phosphate-based surface active agents or the like can be used.

If the substrate itself has a color material receiving ability, substrate 6 may also act as the receptor layer without forming any independent receptor layer.

Adhesive Layer

The adhesive layer 7 is formed on a back surface side of substrate 6 in order to permit the sticker portion 2 peeled off the release sheet portion 3 to adhere to other articles. As the material for constituting the adhesive layer 7, it is possible to use polyacrylates, acrylic copolymers, natural rubber, synthetic rubber, petroleum resin and block copolymer resin such as styrene-butadiene rubber (SBR) etc., to which a reinforcing agent, a plasticizer, fillers etc. can be added as necessary.

The adhesive layer 7 can be formed by coating and drying a coating solution for the adhesive layer in a method known in the art. The amount of adhesive layer 7 coated is usually in the range of 8 to 20 $g/m^2$ in terms of the weight of the dried coating.

Now, the method of manufacturing the thermal transfer image-receiving sheet of the present invention is described. For the thermal transfer image-receiving sheet 1, a coating solution for the receptor layer is coated on the front surface side of the previously prepared substrate 6 and dried to form the receptor layer 4, and a coating solution for the adhesive layer is coated on the back surface side of the substrate 6 and dried to form the adhesive layer 7 to prepare the sticker portion 2. If necessary, before formation of the receptor layer 4, the coating solution for the intermediate layer may be coated on the front surface side of the substrate 6 and dried to form the intermediate layer 5, and the receptor layer 4 may be formed on the front surface side of the intermediate layer 5. Further, the adhesive layer 7 may be formed on the back surface side of the substrate 6 when laminating the release sheet portion 3 and the sticker portion 2.

The release sheet portion 3 is formed by extrusion-laminating synthetic resin with a softening point of 110° C. or more on the back surface side of the support to form the grip layer of a non-oriented synthetic resin layer on the back surface side of the support layer 9. Alternatively, the first polyethylene resin layer 8 can be disposed as necessary on the front surface side of the support layer 9, and the second polyethylene resin layer 10 to be disposed as a primer coat of the grip layer may, along with synthetic resin of a softening point of 110° C. or more constituting the grip layer, be subjected to co-extrusion lamination to form the release sheet portion 3.

Then, the release sheet portion 3 is laminated on the adhesive area 13 on the back surface side of the sticker portion 2 such that the front side of the release sheet portion 3 faces the adhesive area 13, and the adhesive area 13 is covered with the release sheet portion 3 in a peelable adhesive strength whereby the thermal transfer image-receiving sheet 1 of the present invention can be produced.

The spikes 29 on the metal roller 28 bite into the grip layer formed on the release sheet portion 3, thus preventing misregistering at the reciprocating motion for forming color printed images. Accordingly, misregistering does not occur in the formed color printed images.

Further, a non-oriented synthetic resin layer with a softening point of 110° C., most preferably the non-oriented polypropylene resin layer 11 is used as the grip layer, and the second polyethylene resin layer 10 is interposed between the grip layer and the support sheet 9, whereby spikes 29 are prevented from penetrating the thermal transfer image-receiving sheet 1 from the back side thereby raising the qualities of the color printed product. Further, the biting of spikes 29 is improved, thus preventing misregistering extremely effectively.

EXAMPLES

Hereinafter, the thermal transfer image-receiving sheet 1 of the present invention and the method of manufacturing the same are described in detail.

Example 1

First, a milky white PET film of 50 μm in thickness (E-63, manufactured by Toray Industries, Inc.) was used as the substrate 6, and the following coating solution for the intermediate layer was coated on the front surface side of substrate 6 and dried in an amount of 2 g/m² after drying to form the intermediate layer 5, and further the following coating solution for the receptor layer was coated on the intermediate layer 5 and dried in an amount of 4 g/m² after drying to form the receptor layer 4, whereby an intermediate article of the sticker portion 2 having the receptor layer 4, the intermediate layer 5, and the substrate 6 laminated in this order.

| <Coating Solution for Intermediate Layer> | |
|---|---|
| Urethane resin (Nipporan 5199: | Nippon Polyurethane Industry Co., Ltd.) |
| <Coating Solution for Receptor Layer> | |
| (100 parts by weight in total): | |
| Polyester resin (Bylon 200, manufactured by Toyobo Co., Ltd.): | 20 parts by weight |
| Organic silicone (X-22-3000T, manufactured by Shin-Etsu Chemical Co., Ltd.): | 2 parts by weight |
| Toluene: | 39 parts by weight |
| Methyl ethyl ketone: | 39 parts by weight |

Then, a printing paper with a unit weight of 73.3 g/m² (NK Highcoat, manufactured by Nippon Kakob Seishi Co., Ltd.) was used as support sheet 9, and the following first polyethylene resin layer 8 of 20 μm in thickness was formed on the front surface side of the support sheet 9 by extrusion lamination, and the following polypropylene resin was formed into the non-oriented polypropylene resin layer 11 of 30 μm in thickness as the grip layer on the back surface side of the support sheet 9 by extrusion lamination, whereby the release sheet portion 3 having the first polyethylene layer 8, the support sheet 9, and the non-oriented polypropylene resin layer 11 laminated in this order was prepared.

Resin for First Polyethylene Resin Layer
Medium-density polyethylene resin (Sumikasen L5721, manufactured by Sumitomo Chemical Co., Ltd.)
Resin for Non-oriented Polypropylene Resin Layer
Polypropylene resin (J aroma LR711-5, manufactured by Nippon Polyolefin Co., Ltd.)

Finally, the adhesive layer 7 was formed on the back surface side of the substrate 6 of the intermediate article for the sticker portion 2, thereby completing the sticker portion 2, and to the adhesive area 13 of this sticker portion 2 was attached the face subjected to peelability-improving treatment, of the first polyethylene resin layer 8 of the release sheet portion 3, whereby the thermal transfer image-receiving sheet 1 having the receptor layer 4, the intermediate layer 5, the substrate 6, the adhesive layer 7, the first polyethylene resin layer 8, the support sheet 9 and the non-oriented polypropylene resin layer 11 laminated in this order was obtained.

Example 2

The thermal transfer image-receiving sheet in Example 1 was constituted such that the second polyethylene resin layer 10 and the non-oriented polypropylene resin layer 11 were laminated in this order on the back surface side of the support sheet 9. The second polyethylene resin layer 10 made use of the following high-density polyethylene resin, and the non-oriented polypropylene resin layer 11 made use of the same resin as in Example 1, and these were formed into a laminate of 33 μm in thickness in total by co-extrusion lamination using a multi-manifold head. The thickness of the second polyethylene resin layer 10 was 14 μm, and the thickness of the non-oriented polypropylene resin layer 11 was 19 μm. The other conditions were the same as in Example 1.
Resin for Second Polyethylene Resin Layer
Polyethylene resin (J Lex LZ0139-5)

Example 3

In the thermal transfer image-receiving sheet in Example 1, a non-oriented polypropylene resin film formed in a separate step was laminated by lamination to form a grip layer in place of the non-oriented polypropylene resin layer 11 formed by extrusion lamination. The other conditions were the same as in Example 1.

Example 4

In the thermal transfer image-receiving sheet in Example 1, the thickness of the non-oriented polypropylene resin layer 11 as the grip layer was 20 μm. The other conditions were the same as in Example 1.

Example 5

In the thermal transfer image-receiving sheet in Example 1, the thickness of the non-oriented polypropylene resin layer 11 as the grip layer was 50 μm. The other conditions were the same as in Example 1.

Example 6

In the thermal transfer image-receiving sheet in Example 1, the support sheet 9 was replaced by a polyethylene terephthalate film (Crisper G1212, manufactured by Toyobo Co., Ltd.) of 50 μm of the thickness. The other conditions were the same as in Example 1.

Comparative Example 1

In the thermal transfer image-receiving sheet in Example 1, the release sheet portion 3 was replaced by an oriented polyethylene terephthalate film of 100 μm in thickness (Crisper G1212, manufactured by Toyobo Co., Ltd.). The other conditions were the same as in Example 1.

Comparative Example 2

In the thermal transfer image-receiving sheet in Example 1, a biaxially oriented polypropylene resin film of 35 μm in thickness was laminated by lamination to form a grip layer in place of the non-oriented polypropylene resin layer 11 as the grip layer. The other conditions were the same as in Example 1.

Comparative Example 3

In the thermal transfer image-receiving sheet in Example 1, the thickness of the non-oriented polypropylene resin layer 11 as the grip layer was 18 μm. The other conditions were the same as in Example 1.

Performance Evaluation and Results

For performance evaluation, the thermal transfer image-receiving sheets obtained above in the Examples and Comparative Examples were printed by a sublimation transfer type test printer manufactured by the applicant, and misregistering between the 3 colors of yellow, magenta and cyan was determined under a microscope.

For evaluation, misregistering of less than 100 μm was indicated to be "○" as good level, misregistering of 100 μm to less than 200 μm was indicated to be "Δ" as a poor but allowable level, and misregistering of 200 μm or more was indicated to be "×" as unallowable level. The results thus obtained are shown in Table 1.

Further, the productivity of the thermal transfer image-receiving sheets obtained in the Examples or Comparative Examples was also shown in Table 1.

TABLE 1

|  | Misregistering | Productivity |
| --- | --- | --- |
| Example |  |  |
| 1 | ○ | good |
| 2 | ○ | slightly poor in allowable |
| 3 | Δ | good |
| 4 | Δ | good |
| 5 | ○ | slightly poor in allowable |
| 6 | Δ | good |
| Comparative Example |  |  |
| 1 | X | good |
| 2 | X | good |
| 3 | X | good |

Example 1 was excellent in misregistering and productivity. Example 2 was in allowable level, although productivity was slightly inferior to Example 1 in respect of forming the grip layer and the second polyethylene resin layer into a laminate structure by co-extrusion lamination. In Example 2, the non-oriented polypropylene resin layer 11 as the grip layer was slightly thin, but the biting of spikes was good possibly due to formation of the second polyethylene resin layer 10 consisting of high-density polyethylene resin as the primer coat. Example 3 was in allowable level though being slightly inferior in misregistering. In Example 3, the biting of spikes was slightly worsened possibly because slight extension of the non-oriented polypropylene resin film at the time of laminating the film resulted in increase in Young's modulus and thus in hardness. Example 4 was in allowable level though being slightly inferior in biting of spikes because the non-oriented polypropylene resin layer 11 was thin. Example 5 was in allowable level though being slightly inferior in productivity of the laminate by co-extrusion lamination because the non-oriented polypropylene resin layer 11 was thick. Example 6 was in allowable level though being inferior in misregistering due to use of a polyethylene terephthalate film as the support sheet 9.

In Comparative Example 1, the oriented polyethylene terephthalate film was hardly bitten by spikes and was inferior in misregistering. In Comparative Example 2, the non-oriented polypropylene resin layer 11 as the grip layer was substituted by a biaxially oriented film, and thus it was hardly bitten by spikes and was inferior in misregistering. In Comparative Example 3, the non-oriented polypropylene resin layer 11 was made thinner, and thus its misregistering was made inferior because it could not well hold bitten spikes, resulting in trembling and sliding between the spikes and the thermal transfer image-receiving sheet.

According to the thermal transfer image-receiving sheet for a sticker as described above, the non-oriented synthetic resin layer with a softening point of 110° C. or more provided as the grip layer is well bitten by spikes formed on the metal roller for reciprocating the thermal transfer image-receiving sheet for a sticker. Accordingly, the thermal transfer image-receiving sheet for a sticker is conveyed accurately when reciprocated, and there does not occur misregistering in formed color printed images.

Further, the second polyethylene resin layer provided as the primer coat of the grip layer improves the adhesion between the support sheet and the grip layer and simultaneously facilitates biting of the spikes, so convey accuracy is improved and misregistering does not occur. Further, the second polyethylene resin layer also prevents penetration of spikes, thus achieving printed images free of spike marks.

According to the present method of manufacturing the thermal transfer image-receiving sheet for a sticker, the grip layer effective for preventing misregistering can be formed by extrusion lamination, and therefore the thermal transfer image-receiving sheet for a sticker, which includes the non-oriented and well-bitten grip layer, can be easily formed.

Further, the grip layer and the second polyethylene resin layer are formed in the non-oriented state simultaneously by co-extrusion lamination, and thus it is possible to easily produce the thermal transfer image-receiving sheet for a sticker which does not undergo misregistering, thus achieving images free of spikes.

What is claimed is:

1. A thermal transfer image-receiving sheet for a sticker comprising a sticker portion and a release sheet portion, the sticker portion being comprising a substrate, a receptor layer disposed on a front surface side of the substrate and an adhesive layer disposed on a back surface side of the substrate, the release sheet portion being comprising a support sheet and a grip layer disposed on a back surface side of the support sheet, and an adhesive area of a back surface of the sticker portion being covered with the release sheet in a peelable adhesion with a front surface of the release sheet portion facing to the back surface of the sticker portion, wherein said grip layer is a non-oriented synthetic resin layer having a softening point of 110° C. or more.

2. A thermal transfer image-receiving sheet for a sticker according to claim 1, wherein said grip layer is a non-oriented polyolefine resin layer or a non-oriented polyester resin layer.

3. A thermal transfer image-receiving sheet for a sticker according to claim 2, wherein said grip layer is a non-oriented polyolefine resin layer.

4. A thermal transfer image-receiving sheet for a sticker according to claim 3, wherein said non-oriented polyolefine resin layer is a non-oriented polypropylene resin layer.

5. A thermal transfer image-receiving sheet for a sticker according to claim 1, wherein said grip layer is one formed through extrusion lamination.

6. A thermal transfer image-receiving sheet for a sticker according to claim 1, wherein said grip layer has a thickness in a range of 20 μm to 50 μm.

7. A thermal transfer image-receiving sheet for a sticker according to claim 1, wherein said support sheet is a cellulose paper.

8. A thermal transfer image-receiving sheet for a sticker according to claim 1, wherein said release sheet portion further comprises a polyethylene resin layer disposed on a front surface side of the support sheet.

9. A thermal transfer image-receiving sheet for a sticker according to claim 1, wherein said release sheet portion further comprises a first polyethylene resin layer disposed on a front surface side of the support sheet and a second polyethylene resin layer disposed on the back surface side of the support sheet so as to be interposed between the support sheet and the grip layer.

10. A thermal transfer image-receiving sheet for a sticker according to claim 9, wherein said grip layer is a non-oriented polypropylene resin layer.

11. A thermal transfer image-receiving sheet for a sticker according to claim 10, wherein said second polyethylene resin layer is formed of a resin comprising high density polyethylene.

12. A thermal transfer image-receiving sheet for a sticker according to claim 9, wherein said second polyethylene resin layer and said grip layer are those formed through co-extrusion lamination.

13. A method of manufacturing a thermal transfer image-receiving sheet for a sticker comprising the steps of:

providing a sticker portion comprising a substrate, a receptor layer disposed on a front surface side of the substrate and an adhesive layer disposed on a back surface side of the substrate, forming a release sheet portion comprising a support sheet and a grip layer made of a non-oriented synthetic resin layer disposed on a back surface side of the support sheet by applying a synthetic resin having a softening point of 110° C. or more on the support sheet through extrusion lamination, covering an adhesive area of a back surface of the sticker portion with the release sheet portion in a peelable adhesion by laminating the release sheet portion so as to face a front surface of the release sheet portion to the back surface of the sticker portion.

14. A method of manufacturing a thermal transfer image-receiving sheet for a sticker according to claim 13, wherein, in the step of forming the release sheet potion, said synthetic resin having a softening point of 110° C. or more is applied on the support sheet together with polyethylene resin through co-extrusion lamination to form the release sheet portion further comprising a polyethylene resin layer disposed on the back surface side of the support sheet so as to be interposed between the support sheet and the grip layer.

15. A method of manufacturing a thermal transfer image-receiving sheet for a sticker according to claim 13, wherein said synthetic resin having a softening point of 110° C. or more is polyolefine resin or polyester resin.

16. A method of manufacturing a thermal transfer image-receiving sheet for a sticker according to claim 15, wherein said synthetic resin having a softening point of 110° C. or more is polyolefine resin.

17. A method of manufacturing a thermal transfer image-receiving sheet for a sticker according to claim 16, wherein said polyolefine resin is polypropylene resin.

* * * * *